July 22, 1952     T. DE KONING     2,604,500
APPARATUS AND METHOD FOR VAPORIZATION
COOLING OF ELECTRICAL MACHINES
Filed Dec. 15, 1949     2 SHEETS—SHEET 1

Inventor:
Theodore de Koning
by his Attorneys
Howson &
Howson

July 22, 1952  T. DE KONING  2,604,500
APPARATUS AND METHOD FOR VAPORIZATION
COOLING OF ELECTRICAL MACHINES
Filed Dec. 15, 1949  2 SHEETS—SHEET 2
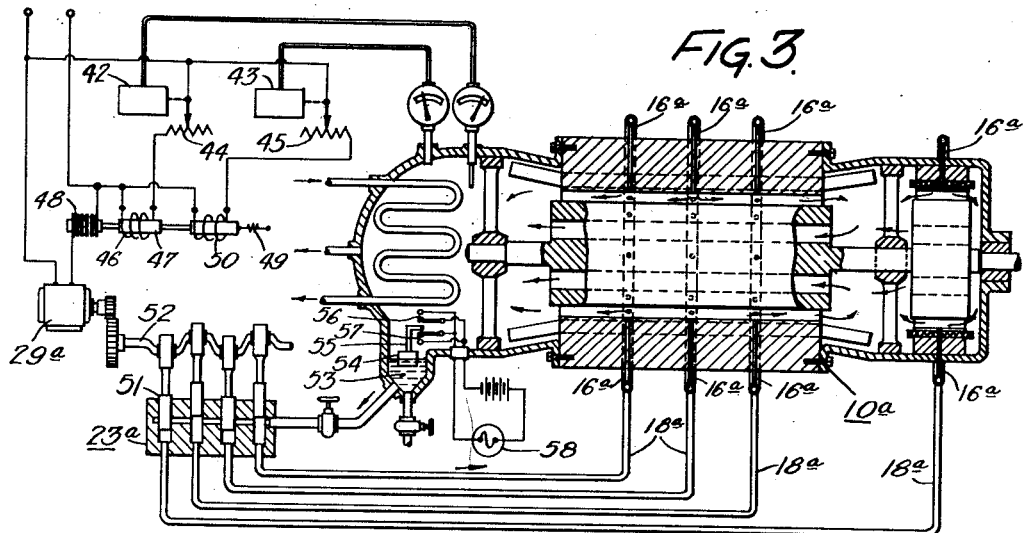
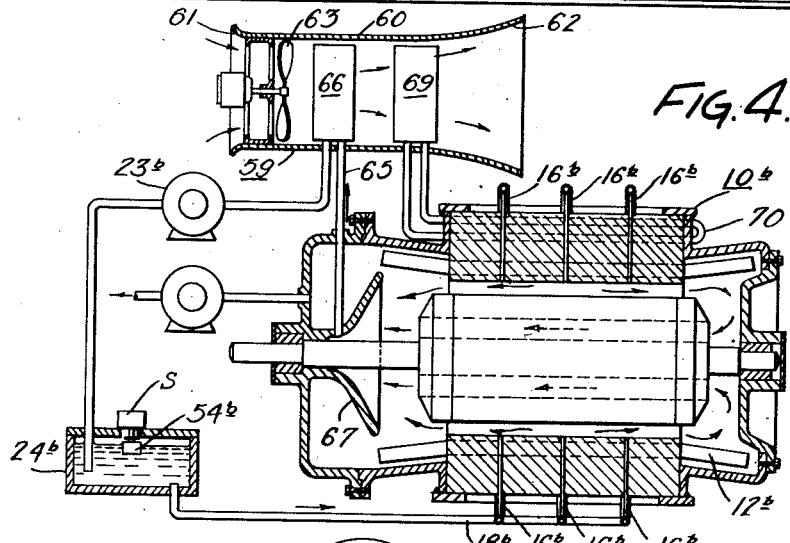
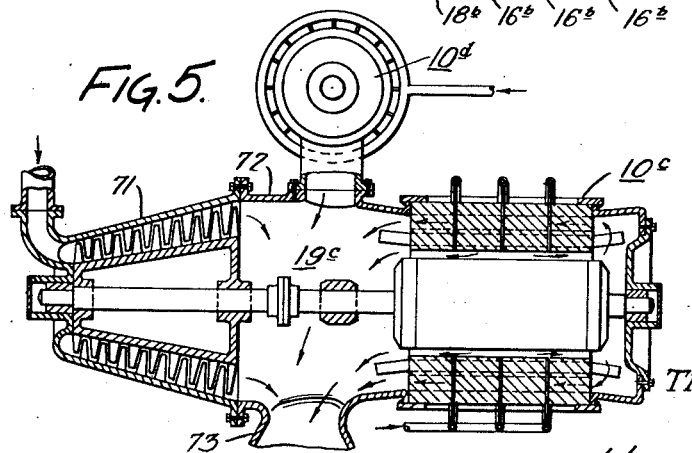
Inventor:
Theodore de Koning
by his Attorneys
Howson & Howson Patented July 22, 1952

2,604,500

UNITED STATES PATENT OFFICE 2,604,500

APPARATUS AND METHOD FOR VAPORIZATION COOLING OF ELECTRICAL MACHINES

Theodore de Koning, Philadelphia, Pa.

Application December 15, 1949, Serial No. 133,030

10 Claims. (Cl. 171—252)

This invention relates to cooling systems for electric motors and generators, and more particularly to systems for cooling machines of this type by means of a finely divided liquid spray.

Prior to the present invention two methods have been generally used to cool electric motors and generators. These are air cooling and hydrogen cooling, and consist essentially of causing a stream of air or hydrogen to flow through the machine. There are several objectionable features in each of these cooling systems. For example, in air cooling a large supply of air is required necessitating the use of large and expensive fan or blower installations and the machine must be open to the atmosphere thus allowing dust and other particles to be drawn into the mechanism. Hydrogen cooling, on the other hand, is very expensive requiring much accessory equipment and skilled men to operate it.

In vaporization cooling according to the present invention, water is supplied in the form of a spray to the interior surfaces of the machine. The machine is maintained at a pressure substantially below atmospheric pressure thereby lowering the vaporization temperature of the liquid sufficiently to cause it to be converted substantially instantaneously into the vapor state by the adsorption of heat from the machine parts and thus cooling the machine.

Vaporization cooling provides a feasible solution for the cooling of large electric machines of all types. For example, compared with air cooling the heat transfer coefficient is at least fifty times as great while at full load only 1/80 of the weight and twenty to forty percent of the gaseous volume is required and even less is required at partial loads. On the other hand, the heat transfer coefficient in a vaporization cooling system is at least twenty-five times as great as the heat transfer coefficient for hydrogen. Thus, even an overdimensioned condenser in the present system will be much smaller than the cooler of a hydrogen cooled machine. Moreover, in vaporization cooling by the present invention, air and all other undesirable materials can be removed from the vapor which is another advantage over hydrogen cooling. Also, a liquid can be cleaned much easier and better than a gas. Dust from the atmosphere, brushes, collectors, and commutators is removed as sludge by a fluid filter. The vapor flow cleans the interior of the machine progressively and neither a scavenger gas nor a long drying-out period is required.

With the foregoing in mind the principal object of the present invention is to provide a novel closed circuit cooling system for electrical machinery in which a liquid spray may be used as the coolant.

Another object of the present invention is to provide a novel closed circuit cooling system for electric motors or generators in which a relatively small amount of coolant is required.

Another object of the present invention is to provide a vapor cooling system for electrical machinery as set forth, embodying novel features of construction and operation which will maintain a low moisture content in the insulation.

Another object of this invention is to provide novel means for cooling electrical machinery that will produce an even temperature gradient along the axis of the machine.

Another object of this invention is to provide a novel closed circuit cooling system having the advantages set forth and in which a common vapor space may be used for two or more machines.

A further object of this invention is to provide a novel closed circuit cooling system for electrical machines requiring a minimum of accessory equipment.

A still further object of the present invention is to provide a cooling system of the type described, having the advantages and characteristics set forth, which is of comparatively simplified construction, and entirely efficient and effective in operation and use.

These and other objects of the invention and the various features and details of the construction and operation thereof are hereinafter fully set forth and described with reference to the accompanying drawings, in which:

Figs. 3 and 4 are views similar to Fig. 1 showing modified forms of the present invention;

Fig. 5 is a cross sectional view of a turbine, a generator, and a motor embodying the present invention utilizing a common vapor space for a plurality of machines.

According to the present invention a liquid spray is caused to impinge on the rotor and stator parts of an electric motor or generator for the purpose of cooling the machine. The machine is enclosed in a fluid-tight housing and the interior is maintained at a pressure substantially below the pressure existing outside the housing. The reduced pressure within the machine housing lowers the vaporization temperature of the liquid spray sufficiently with relation to the normal operating temperature of the machine parts so that as the liquid comes into contact with the parts of the machine and absorbs heat therefrom, it is caused to vaporize substantially instantaneously thereby cooling the machine. Means are provided for condensing and cooling the vapor, withdrawing the condensate from the machine and returning it to the cooling system. Means are also provided for adjustably controlling the temperature desired to be maintained in the electric motor or generator.

Figure 1:
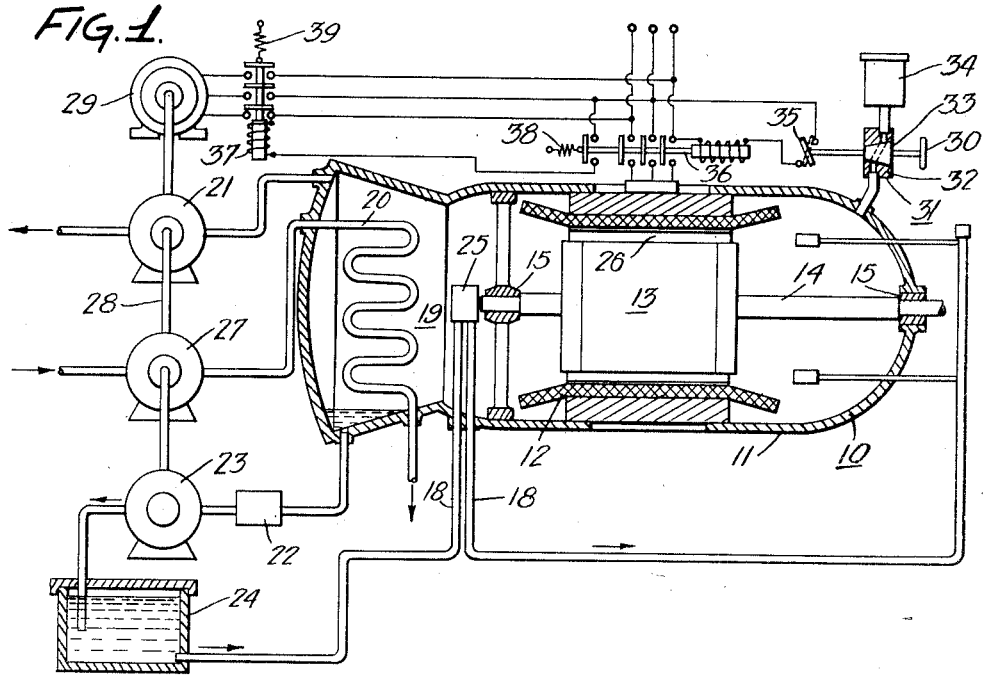
Fig. 1 is a schematic diagram of a vaporization cooling system made in accordance with the present invention applied to an electric motor.
Figure 2:
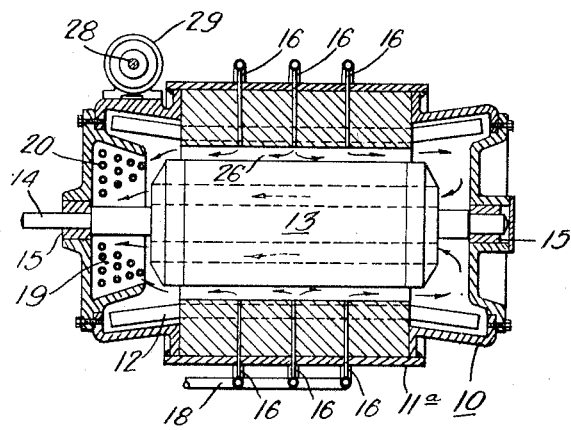
Fig. 2 is a cross sectional view taken longitudinally through an electric motor embodying the present invention.

Bearing the foregoing in mind, the drawings illustrate several embodiments of the present invention, one of which is illustrated in Fig. 1. Referring more specifically to Fig. 1, reference numeral 10 designates generally an electric machine comprising a stator 12 and rotor 13. Casing members 11, 11 are provided and, in conjunction with the stator 12 of the machine, provide a fluid-tight housing for the machine, for example, as shown in Fig. 1, although the entire machine including the stator may be completely enclosed in a casing 11a, for example, as shown in Fig. 2. The rotor 13 is mounted to rotate within the stator 12 on a shaft 14 which is supported by bearings 15 in the casing members 11. The machine 10 may be either a generator or a motor, there being no difference in the operation of the cooling system of the present invention, hereinafter described.

The coolant is injected or introduced into the housing 11 in the form of a liquid spray, for example, water, and is caused to impinge upon the rotor and stator parts of the machine. Injection of the liquid may be accomplished, for example, by means of a series of hair tubes 16 which are schematically shown in Fig. 1 but in Fig. 2 extend through the stator 12 circumferentially and longitudinally of the rotor 13. Liquid is supplied to these hair tubes 16 from a supply pipe 18. A nozzle (not shown) may be placed on the ends of the hair tubes to produce a finely diffused spray.

The vaporized liquid flows through the machine to a chamber 19 provided within the housing, for example, at one end thereof removed from the parts of the machine, and is there condensed by a condenser 20. The condenser may be of the water cooled type having associated therewith a pump 27 for circulating water or other coolant through the condenser 20. The condensate is collected and withdrawn from the machine 19 and through a filter 22 by a condensate pump 23. Particles of dirt or dust on any parts of the machine 10 which may be removed by the vapor passing through the machine will be collected in the condensate and removed by the filter 22. The condensate is delivered to a tank 24 from which it is recirculated.

A pressure substantially below atmospheric pressure is maintained within the casing 11 by means of a vacuum pump 21. The vacuum pump 21 is connected to a shaft 28 along with the circulating pump 27 and the condensate pump 23, and the assembly is driven by a motor 29. By virtue of the reduced pressure in the machine 10 the condensate pump 23, which also serves as an injection pump for the cooling liquid, may be of the positive displacement type so that injection of the liquid into the housing 11 is independent of the pressure therein.

Suitable means are provided to control the temperature of the component parts of the machine 10. For this purpose a temperature responsive valve 25 is connected in the liquid line 18 and disposed in the interior of the machine 10 between the rotor 13 and the chamber 19. This temperature responsive valve 25 is constructed and adjusted to close at and below a predetermined temperature and to open above that temperature thus controlling the flow of cooling liquid through the intake pipe 18 to the point of injection into the machine 10 in accordance with the temperature of the latter.

It is desirable to adjust the temperature responsive valve 25 so that it will operate to cut off the flow of liquid at a temperature at which the vapor is slightly superheated as it leaves the air gap 26. This condition prevents any condensate from forming on the component parts of the machine 10. For example, at 0.8 p. s. i. a. pressure existing in the housing 11, the vaporization temperature of the liquid spray is 94.8° F. and a desirable temperature setting for operation of the temperature responsive valve 25 is approximately 104° F. Again, at 1.8 p. s. i. a. pressure existing in the housing 11, the vaporization temperature is 118° F. and a desirable temperature setting for operation of the temperature responsive valve 25 is approximately 127° F.

The machine 10 is put into operation by turning a handle 30 which closes an air inlet valve to the machine 10 31 and the electric circuits to the machine 10 and the motor 29. The air inlet valve 31 preferably is of the rotary plug type having a stationary casing 32 and a plug 33 secured to the handle 30 in such a manner that when the handle 30 is in one position the valve 31 is open and when said handle 30 is rotated 180° the valve 31 is closed. In the open position of the valve dry air is admitted through an air filter 34 to the interior of the casing 11 to absorb and prevent condensation of any moisture that might be in the machine 10.

Secured to the plug 33 and rotatable therewith is a switch element 35. When the air inlet valve 31 is closed the switch element 35 likewise is closed to complete the circuit to a solenoid operated relay switch 36. The relay switch 36 completes the circuit to the machine 10 and operates a second relay switch 37 which closes the circuit to the motor 29 which drives the pumps 21, 23 and 27, respectively. The relay switches 36 and 37 are normally held in the open position by means of springs 38 and 39, respectively.

Figure 6:
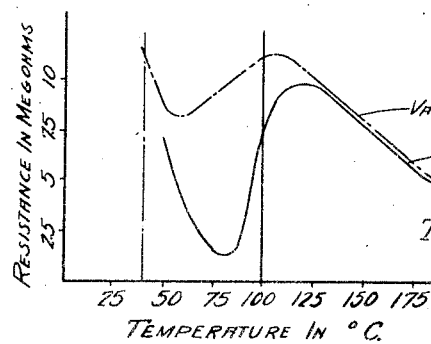
Fig. 6 is a graph showing how the insulation resistance under predetermined conditions of a machine cooled by liquid vaporization compares to that of an air cooled mchine under such conditions.

An important feature of the present invention is the fact that the resistance of the insulation to current flow therethrough is substantially increased by the use of vaporization cooling. The electric disruptive strength of water is about twice that of air, and hence in the mist stage and especially in the superheated vapor stage water is a good insulator. With the machine in service water cannot penetrate the insulation as its surface is above the vaporization temperature of the liquid, and when out of service air admitted to the machine through the valve 31 and filter 34 also maintains the insulation dry. In air cooled or hydrogen cooled machines water on the windings can cause damage because of through wetting. As shown in Fig. 6 by the resistance-temperature curve for hygroscopic paper insulation, there is a drop in the resistance between 50 and 100 degrees centigrade for an air cooled machine, whereas in a vaporization cooled machine the drop in resistance is near the lowest temperature the machine will assume in or out of service, and as the temperature reaches the point that the machine will assume in service the insulation resistance increases. The reason for this is that any moisture entrained in the insulation will vaporize due to the low pressure in the machine and thus aid in increasing the insulation resistance.

A more complete disclosure of control equipment for the present invention is shown in the modification in Fig. 3. In this instance the temperature and pressure in the interior of the machine casing 11 is controlled by temperature and pressure responsive means 42 and 43, respectively, which in turn actuate rheostats 44 and 45 that control the speed of a motor 29a. By this construction and arrangement, as the temperature within the casing increases the temperature responsive means 42 will operate to decrease the resistance of the rheostat 44 thus increasing the current to a solenoid coil 46. This increases the pressure of the solenoid core 47 against a carbon pile regulator 48 which in turn increases the speed of the motor 29a thus increasing the rate of injection of cooling liquid into the machine 10a. The solenoid core 47 is normally held away from the carbon pile regulator 48 by a spring 49. As the pressure in the interior of the machine 10a increases the current to the solenoid coil 50 likewise is increased through the action of the pressure responsive means 43 and the rheostat 45. This increases the pressure of the solenoid core 47 on the carbon pile 48 thus increasing the speed of the motor 29a and hence the amount of liquid supplied to the machine. It will be noted that the pressure and temperature in the motor 10a are inter-related so that there is no possibility of the two coils 46 and 50 opposing each other.

The condensate pump 23a also serves as an injection pump. In this instance the condensate pump 23a is of the positive displacement type having separate plungers 51 operated by a crankshaft 52. The plungers 51 draw the condensate from a sump 53 in the motor casing 11a and recirculate it through the pipes 18a and injector tubes 16a.

The liquid level in the condensate sump 53 remains practically constant under normal operating conditions. However, if a leak should occur in the injection system, the liquid level in the condensate sump 53 would drop rapidly indicating that not enough cooling liquid was being supplied to the machine. Conversely, if too much liquid is supplied to the machine, the liquid level in the sump 53 would rise and there is the danger that the liquid would cause a short circuit in the windings. To prevent this, visible means are provided to give warning when these conditions exist.

Such indicator means may consist of a float 54 having an extension 55 thereon which operates to close contacts 56 when the fluid level rises above an upper safe limit and close contacts 57 when the level falls below the lower safe limit, respectively. When either of the contacts 56 or 57 is closed, an electric circuit to the signaling means, such as a lamp 58, is completed.

A further modification of the present invention is shown in Fig. 4. In this embodiment an air duct 59 is provided for condensing the vapor. The air duct 59 consists of a large tube 60 having flared inlet and outlet portions 61 and 62, respectively, to provide substantially a Venturi type section. A motor driven fan 63 is supported by a bracket 64 in the inlet of the air duct 59 to provide the required flow of air therethrough. In operation, the vapor is withdrawn from the machine 10b through an outlet pipe 65 to a heat transfer unit 66 placed in the air duct 59, and a funnel-like collector 67 located in the interior of the machine 10b directs the vapor into the pipe 65. The condensate is removed from the heat transfer unit 66 by a condensate pump 23b and is collected in a tank 24b from which it is recirculated to the machine through pipe 18b and tubes 16b. A float 54b may be positioned in the tank 24b to operate a switch S similar to the type shown in Fig. 3 for the purpose of giving a warning through some suitable signaling means (not shown) of an abnormal change in the fluid level in the tank 24b.

The stator 12b may be cooled additionally by tubes 70 containing a coolant, for example, a liquid such as water. The liquid in the pipes 70 after absorbing heat from the stator 12b is cooled by a heat transfer unit 69 placed in the air duct 59, and then recirculated.

A further modification of the present invention is shown in Fig. 5. In this instance a turbine 71 and a generator 10c are connected together in axial alignment and have associated therewith a motor 10d. The turbo-generator and motor are arranged and interconnected by means of a housing member 72 which provides between them a common vapor space 19c. Thus the cooling vapor from the motor 10d and the generator 10c may exhaust into the chamber 19c as may the steam from the turbine 71. By this construction only a single condenser is required for condensing the vaporized cooling liquid introduced to the generator 10c and motor 10d, since the vapor from both of these machines enters the common chamber 19c from which it passes through a duct 73 to a condenser (not shown).

From the foregoing it is apparent that the present invention provides a novel cooling system for electric machines that is simple yet highly efficient and effective in operation. Furthermore, a readily obtainable and comparatively inexpensive cooling liquid may be used to maintain the machine at a constant temperature with a minimum of accessory equipment.

While certain embodiments of this invention have been illustrated and described herein, it is not intended to limit the invention to such disclosures, and changes and modifications may be incorporated and embodied therein within the scope of the following claims.

I claim:

1. In apparatus for cooling electrical machinery having rotor and stator parts, a substantially fluid-tight housing enclosing said parts, means providing a condensing chamber relatively removed from the rotor and stator parts, means including a plurality of small tubes for injecting a liquid spray interiorly of said housing into close proximity with the rotor and stator parts, regulating means to control the flow of cooling liquid to said tubes, mechanism operable to maintain a pressure within said housing substantially below that existing exteriorly of the housing, the reduced pressure in the housing operating to lower the vaporization temperature of the liquid spray sufficiently with relation to the temperature of the rotor and stator parts of the machine to cause the liquid to be converted substantially instantaneously into the vapor state thereby absorbing heat from said parts and cooling the same, condensing means in said condensing chamber operable to condense the vaporized liquid, means responsive to the temperature of the vaporized liquid entering the condensing chamber operable to actuate said regulating means and thereby control the volume of cooling liquid injected into the machine through said tubes, and means including a pump for removing the condensate and recirculating the same to said machine.

2. In apparatus for cooling electrical machinery having rotor and stator parts, a substantially fluid-tight housing enclosing said parts, means providing a condensing chamber relatively removed from the rotor and stator parts, a plurality of small tubes in said stator arranged circumferentially and longitudinally of the rotor parts for injecting a liquid spray interiorly of said housing and into close proximity with the parts of the machine, regulating means to control the flow of cooling liquid to said tubes, mechanism operable to maintain a pressure within said housing substantially below that existing exteriorly of the housing, the reduced pressure in the housing operating to lower the vaporization temperature of the liquid spray sufficiently with relation to the temperature of the rotor and stator parts of the machine to cause the liquid to be converted substantially instantaneously into the vapor state thereby absorbing heat from said parts and cooling the same, condensing means in said condensing chamber operable to condense the vaporized liquid, means responsive to the temperature and pressure of the vaporized liquid entering the condensing chamber operable to actuate said regulating means and thereby control the volume of cooling liquid injected into the machine through said tubes and means for removing the condensate and recirculating the same to said machine.

3. In apparatus for cooling electrical machinery having rotor and stator parts, a substantially fluid-tight housing enclosing said parts, means providing a condensing chamber relatively removed from the rotor and stator parts, a plurality of small tubes in said stator arranged circumferentially and longitudinally of the rotor parts for injecting a liquid spray interiorly of said housing and into close proximity with the parts of the machine, regulating means to control the flow of cooling liquid to said tubes, mechanism to maintain the vaporization temperature of the liquid spray sufficiently lower than the temperature of the rotor and stator parts of the machine to cause the liquid to be converted substantially instantaneously into the vapor state thereby absorbing heat from said parts and cooling the same, said mechanism comprising means responsive to the temperature of the vaporized liquid entering the condensing chamber operable to actuate said regulating means and thereby control the volume of cooling liquid injected into the machine through said tubes, and condensing means in said condensing chamber operable to condense the vaporized liquid.

4. In apparatus for cooling electrical machinery having rotor and stator parts, a substantially fluid-tight housing, means for injecting a liquid spray interiorly of said housing and into close proximity with the rotor and stator parts of the machine, mechanism operable to maintain a pressure within said housing substantially below that existing exteriorly of the housing, the reduced pressure in the housing operating to lower the vaporization temperature of the liquid spray sufficiently with relation to the temperature of the rotor and stator parts of the machine to cause the liquid to be converted substantially instantaneously into the vapor state thereby absorbing heat from said parts and cooling the same, means responsive to the temperature interiorly of the machine for controlling the flow of cooling liquid to the machine and the vaporization temperature thereof and thus the temperature interiorly of the machine, and means operable to remove the vaporized liquid from the interior of said machine.

5. In apparatus for cooling electrical machinery having rotor and stator parts, a substantially fluid-tight housing providing a condensing chamber relatively removed from the machine, means for injecting a liquid spray interiorly of said housing and into contact with the rotor and stator parts of the machine, mechanism operable to maintain a pressure within said housing substantially below that existing exteriorly of the housing, the reduced pressure in the housing operating to lower the vaporization temperature of the liquid spray sufficiently with relation to the temperature of the rotor and stator parts of the machine to cause the liquid to be converted substantially instantaneously into the vapor state thereby absorbing heat from said parts and cooling the same, a valve responsive to the temperature of the rotor and stator parts placed intermediate said parts and the condensing chamber for controlling the flow of cooling liquid to the machine and the temperature thereof, condensing means in said housing chamber operable to condense the vaporized liquid, and means for removing the condensate and recirculating the same to said machine.

6. In apparatus for cooling electrical machinery having rotor and stator parts, a substantially fluid-tight housing providing a condensing chamber relatively removed from the machine, means for injecting a liquid spray interiorly of said housing and into contact with the rotor and stator parts of the machine, mechanism operable to maintain a pressure within said housing substantially below that existing exteriorly of the housing, the reduced pressure in the housing operating to lower the vaporization temperature of the liquid spray sufficiently with relation to the temperature of the rotor and stator parts of the machine to cause the liquid to be converted substantially instantaneously into the vapor state thereby absorbing heat from said parts and cooling the same, control means responsive to the temperature and pressure in the housing operable to regulate the flow of cooling liquid to the machine and the temperature and pressure thereof, condensing means in said housing chamber operable to condense the vaporized liquid, and means for removing the condensate and recirculating the same to said machine.

7. In apparatus for cooling electrical machinery having rotor and stator parts, a switch for placing the machine in and out of service, a substantially fluid-tight housing providing a condensing chamber relatively removed from the machine, means for injecting a liquid spray interiorly of said housing and into contact with the rotor and stator parts of the machine, mechanism operable to maintain a pressure within said housing substantially below that existing exteriorly of the housing, the reduced pressure in the housing operating to lower the vaporization temperature of the liquid spray sufficiently with relation to the temperature of the rotor and stator parts of the machine to cause the liquid to be converted substantially instantaneously into the vapor state thereby absorbing heat from said parts and cooling the same, valve means operable to admit dry air to the interior of the housing when said machine is out of service, the switch operatively associated with said valve means and arranged to be in the open circuit position when the valve is in the position admitting air to the interior of the housing and in closed circuit position when the valve is closed, condensing means in said housing chamber operable to condense the vaporized liquid, and means for removing the condensate and recirculating the same to said machine.

8. In apparatus for cooling electrical machinery having rotor and stator parts, a substantially fluid-tight housing, mechanism including means defining a plurality of openings extending interiorly of the machine to inject a finely divided spray of cooling liquid into the air gap between the rotor and stator parts and into close proximity with said parts, regulating means to control the flow of cooling liquid to said plurality of openings, and mechanism to maintain the vaporization temperature of the liquid spray sufficiently lower than the temperature of the rotor and stator parts of the machine to cause all of the liquid to be converted substantially instantaneously into the vapor state thereby absorbing heat from said parts and cooling the same, said mechanism including means responsive to the temperature of the vaporized liquid operable to actuate said regulating means and thereby control the volume of the cooling liquid injected into said air gap through said openings.

9. In apparatus for cooling electrical machinery having rotor and stator parts, a substantially fluid-tight housing enclosing said parts, means providing a condensing chamber relatively removed from the rotor and stator parts, means including a plurality of small tubes extending interiorly of the machine to inject a finely divided liquid spray into the air gap between the rotor and stator parts and in close proximity with said parts, regulating means to control the flow of cooling liquid to said tubes, mechanism to maintain the vaporization temperature of the liquid spray sufficiently lower than the temperature of the rotor and stator parts to cause all the liquid to be converted substantially instantaneously into the vapor state thereby absorbing heat from said parts and cooling the same, said mechanism including means responsive to the temperature of the vaporized liquid entering the condensing chamber operable to actuate and regulating means and thereby control the volume of cooling liquid injected into said air gap through said tubes, condensing means in said condensing chamber operable to condense the vaporized liquid, and means including a pump for removing the condensate and recirculating the same to said machine.

10. In apparatus for cooling electrical machinery having rotor and stator parts, means including a plurality of small tubes extending through the stator parts to inject a finely divided liquid spray into the air gap between the rotor and stator parts in close proximity with said parts, regulating means to control the volume of liquid injected into said air gap through said tubes, mechanism operable to maintain a pressure within said housing substantially below that existing exteriorly of the housing, the reduced pressure in the housing operating to lower the vaporization temperature of the liquid spray sufficiently with relation to the temperature of the rotor and stator parts of the machine to cause all of the liquid to be converted substantially instantaneously into the vapor state thereby absorbing heat from said parts and cooling the same, and means responsive to the temperature of the vaporized liquid operable to actuate said regulating means and thereby control the volume of cooling liquid injected into said air gap through said tubes.

THEODORE DE KONING.

REFERENCES CITED

The following references are of record in the file of this patent:

UNITED STATES PATENTS

| Number | Name | Date |
| --- | --- | --- |
| 270,518 | Vander Weyde | Jan. 9, 1893 |
| 1,121,014 | Hobart | Dec. 15, 1914 |
| 1,190,048 | Treitel | July 4, 1916 |
| 1,761,387 | Gay | June 3, 1930 |
| 1,938,077 | Lysholm | Dec. 5, 1933 |

FOREIGN PATENTS

| Number | Country | Date |
| --- | --- | --- |
| 165,806 | Great Britain | July 11, 1921 |
| 170,946 | Great Britain | Oct. 31, 1921 |